United States Patent [19]
Porter

[11] 3,879,287
[45] Apr. 22, 1975

[54] CONTINUOUS ION EXCHANGE PROCESS AND APPARATUS

[76] Inventor: Robert R. Porter, 304 1st Security Bldg., Salt Lake City, Utah 84111

[22] Filed: Oct. 31, 1972

[21] Appl. No.: 302,589

[52] U.S. Cl................. 210/33; 23/270 R; 210/189
[51] Int. Cl........................... B01d 15/06; B01j 1/06
[58] Field of Search ............ 210/33, 189, 252, 255, 210/268; 23/270 R

[56] References Cited
UNITED STATES PATENTS

| | | | |
|---|---|---|---|
| 3,445,382 | 5/1969 | Wace | 210/33 |
| 3,573,004 | 3/1971 | Abrams et al. | 210/33 |
| 3,595,385 | 7/1971 | Duff | 210/33 |
| 3,674,685 | 7/1972 | Arden et al. | 210/33 |

Primary Examiner—Samih N. Zaharna
Assistant Examiner—Ivars Cintins
Attorney, Agent, or Firm—Mallinckrodt & Mallinckrodt

[57] ABSTRACT

A solution to be treated by ion exchange is continuously introduced into the bottom of the first of a series of ion exchange vessels containing respective adsorption columns of an appropriate, particulate, ion exchange material, and is passed successively through the subsequent ion exchange vessels of the series, so that such solution flows continuously upwardly through each adsorption column, thence to the bottom of the next column, and is finally discharged from the last column of the series as fully treated solution. The loaded adsorption column is removed from the first vessel of the series, usually to eluting means for regeneration, and the other adsorption columns are transferred from vessel to vessel up the line, the adsorption column of the last vessel of the series being replaced by substantially unloaded ion exchange material, usually eluted material from the adsorption column of the first vessel of the series. The cycle is repeated continuously throughout any given period of operation of the method. The eluting means preferably comprises one or more conventional fixed bed ion exchange vessels, with or without a holding vessel in advance thereof, and there is preferably an excess of ion exchange material at this stage so that, in conjunction with such vessel or vessels, there is a metering of ion exchange material circulating batchwise through the system countercurrent to the solution.

19 Claims, 5 Drawing Figures

PATENTED APR 22 1975 3,879,287
SHEET 1 OF 2
FIG. 1.
FIG. 2.
FIG. 4.
FIG. 3.
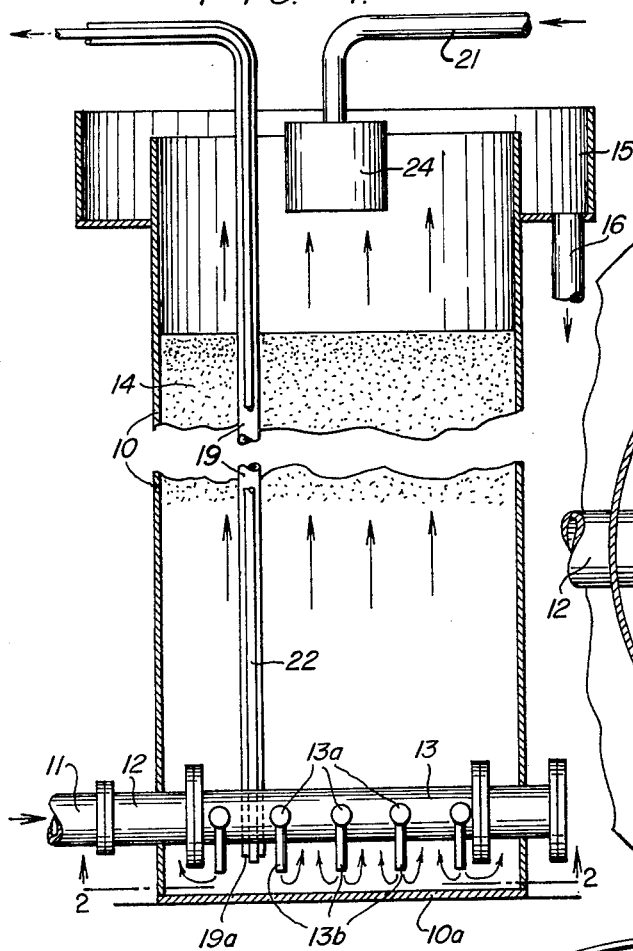
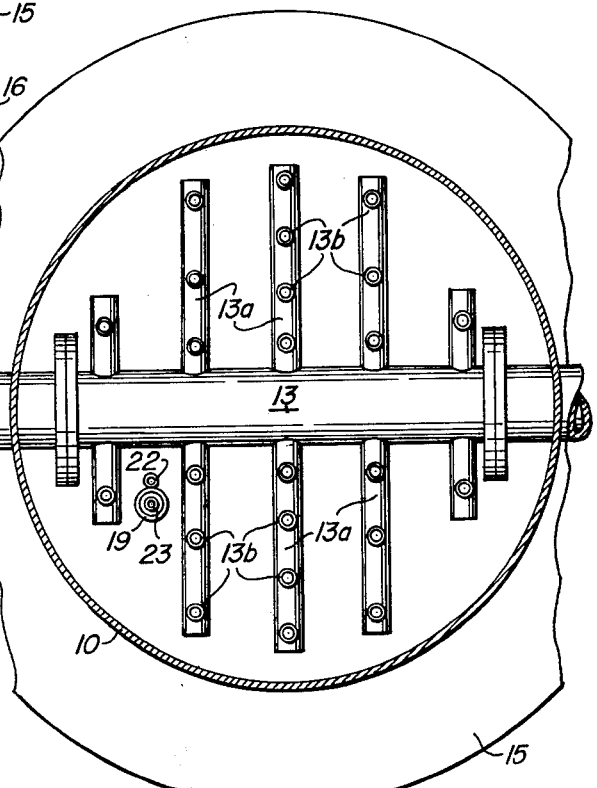
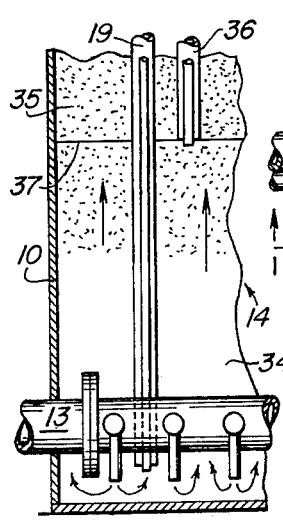
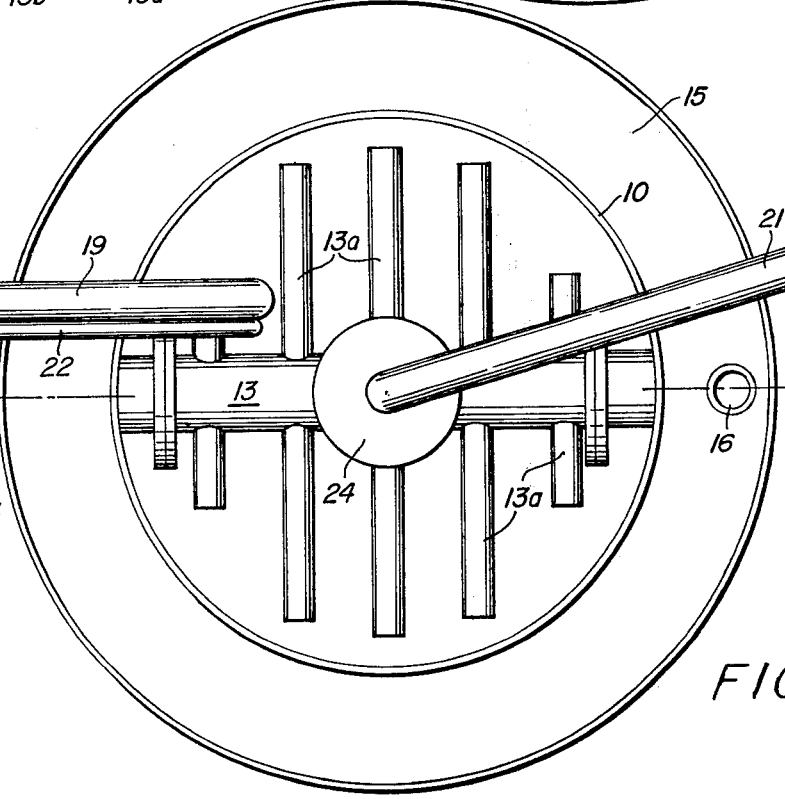

CONTINUOUS ION EXCHANGE PROCESS AND APPARATUS

BACKGROUND OF THE INVENTION

1. Field

The invention is in the field of the treatment of solutions by ion exchange, and of apparatus therefor, for either the extraction of mineral values from a solution containing such values, e.g., as a pregnant leach solution, or for the removal of unwanted minerals dissolved in a liquid, such as in the softening or hard water by the removal of calcium ions therefrom.

2. State of the Art

Treatment of solutions by ion exchange is presently widely used for both mineral recovery and water softening. Conventional systems often require pressure tanks as ion exchange in which the solution is forced through a fixed bed of ion exchange material, such as the mineral zeolite or a synthetic ion exchange resin. A disadvantage of fixed bed systems is that the solution must be clarified before it is introduced into the pressure tanks, because any solids in the solution will tend to clog the bed of ion exchange material. In the usual system, interruption of solution flow is required periodically to allow for the regeneration of the ion exchange material. Although continuous systems have been proposed heretofore, they have been very expensive to construct and difficult to operate by reason of the fact that the ion exchange material has been continuously or incrementally moved from the adsorption columns for either further exchange of ions with a continuously flowing solution or for elution and regeneration.

SUMMARY OF THE INVENTION

According to the invention, a solution to be treated by ion exchange is passed in a continuous stream into, through, and out of a series of ion exchange vessels containing respective adsorbent columns of an appropriate, particulate, ion exchange material, entering each column at its bottom, flowing upwardly through the column, preferably expanding the bed of ion exchange material upwardly as it flows, and finally passing out of the column at its top, to repeat this flow sequence in the next subsequent vessel of the series if such there be. The so treated solution flows from the last vessel of the series for use, as in the case of soft water, or to waste or reuse in the instance of a barren solution from which a valued mineral has been extracted by the ion exchange material.

The adsorbent column in the first vessel of the series is removed in a batch operation, which may involve the entire column all at one time, or which, more to be preferred, may be a continuous withdrawl of ion exchange material therefrom, as by means of an air lift, over a period of time. Thereafter, the adsorbent column of the second vessel of the series is similarly transferred to the first vessel, and so on in sequence from vessel to vessel along the line of vessels, if subsequent vessels there be in the particular series concerned. Regardless of how removal or transfer of the adsorbent columns is accomplished, one adsorbent column is substantially completely removed or transferred from its ion exchange vessel before being replaced by the next subsequent adsorbent column. The last adsorbent column in the series is replaced by fresh or regenerated ion exchange material, usually the latter in the form of eluted mater- tial from the first adsorbent column.

The sequence is repeated continuously in cycles throughout any given period of operation of the process. Each cycle is preferably carried out automatically in timed sequence under the control of a suitable instrumentality, such as an automatic sequence valve through which pressure air is routed, in turn, to air lifts associated with the ion exchange vessels, respectively.

Both anionic material and cationic material may be included in the adsorption columns, in which event removal of the column from the first vessel is effected by dual air lifts, the bottom of one of which is located just above the interface of the two materials in the column and the bottom of the other of which is located at the bottom of the column.

Eluting of the ion exchange material from the first column for recycling through the system as regenerated material is preferably effected in one or more elution vessels, which may or may not be preceeded by a holding vessel, the elution vessel or vessels feeding regenerated ion exchange material into the last ion exchange vessel of the series, usually by pumping it from the one to the other as a slurry, the pump being started and stopped manually as required or being under the aromatic control of suitable timing means correlated in its operation with the automatic sequence valve controlling operation of the air lifts.

To avoid imbalance in the systems, which may otherwise occur by reason of the difficulty of exactly metering transfer of ion exchange material from vessel to vessel of the system, it is an optional but significant feature of the invention that there be an excess of ion exchange material in either the first ion exchange vessel of the series or the holding vessel, if such there be, or in both vessels, and that the elution vessel or vessels be conventional, fixed bed, ion exchange vessels. These provisions in the system constitute metering or monitoring means by which the quantity of ion exchange material in any batch of such material sent to the last ion exchange vessel in the series can be kept constant. In this connection, it will be desirable to utilize a visual level indicator on the holding vessel, if control is manual, or level control instrumentation if control is automatic.

DRAWINGS

The best mode presently contemplated of carrying out the invention is illustrated in the accompanying drawings, in which:

FIG. 1 is a view in vertical axial section of an ion exchange vessel containing an adsorption column, which is free to expand upwardly, such vessel being typical of the type of ion exchange vessels that can be used in the system of the invention;

FIG. 2, is a horizontal section taken on the line 2—2 of FIG. 1;

FIG. 3, is a top plan view;

Figure 5:
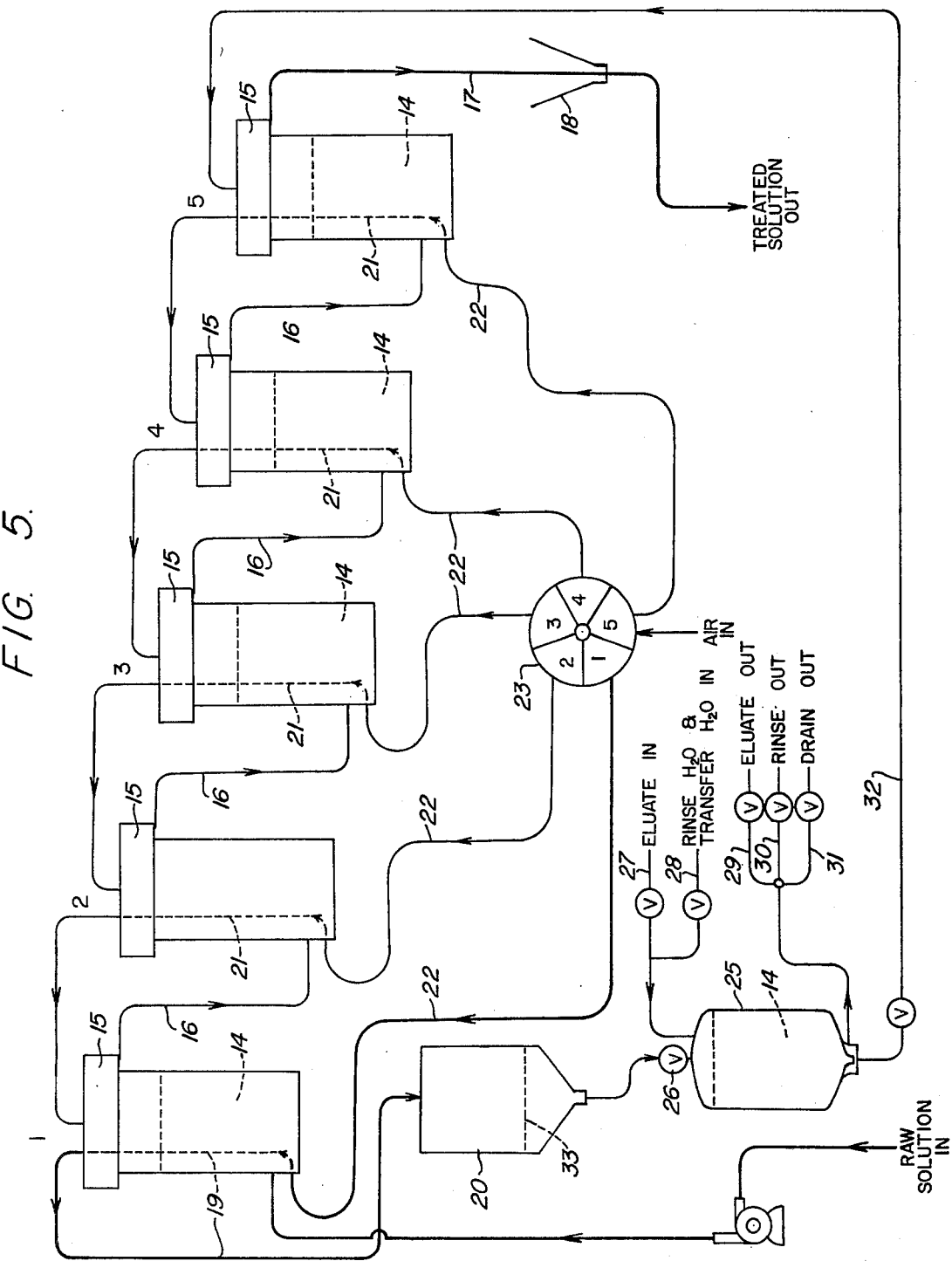

FIG. 4, a view corresponding to that of FIG. 1, but fragmentary and showing an instance in which both anionic and cationic ion exchange materials are utilized; and ‘FIG. 5, a schematic showing of an entire ion exchange treatment system made up of a series of the ion exchange vessels shown in FIGS. 1–3, and including a preferred arrangement of elution and elution control apparatus, the showing being at the stage where the adsorption column from the first ion exchange vessel is in the elution vessel to be eluted and the adsorption column of the second ion exchange vessel of the series has replaced that transferred from the first ion exchange vessel to the elution vessel.

DETAILED DESCRIPTION OF ILLUSTRATED EMBODIMENT

In the specific form illustrated, each ion exchange vessel 10 of the system shown in FIG. 5 is open at its top and is supplied from an inflow pipe, see 11, FIG. 1, with solution to be treated. Such inflow pipe connects through a coupling 12 with a distribution manifold 13 having branches 13a provided with downwardly directed injection nozzles 13b, which discharge streams of the solution against the bottom 10a of the vessel.

The so-injected solution rises forcibly through an adsorbent column 14 of a suitable ion exchange material, such as a synthetic resin, capable of exchaning ions with ions to be removed from the solution. The adsorbent column is not confined at its top, so is free to expand upwardly under the influence of the rising solution in the vessel. The height of the vessel is sufficiently greater than the height of the adsorbent column that substantially only clear solution overflows at the top of the vessel into a launder 15, from where it flows by gravity through a pipe 16 to the bottom of the next subsequent vessel in the series. Pipe 16, like pipe 11, connects with the coupling 12 of such next vessel and serves as the inflow pipe supplying solution thereto.

The solution flows continuously from a source of same into the first ion exchange vessel of the series and thence into and from subsequent ion exchange vessels of the series in turn, there being a total of five such vessels in the series illustrated in FIG. 5, as indicated by the appended reference numbers 1 through 5. Fully treated solution is discharged continuously through discharge piping 17 for use, as with softened water, or for reuse or to waste in instances of solutions carrying dissolved ions of valuable metals such as uranium. A trap 18 for any ion exchange material that may be inadvertantly carried by the out-flowing solution is desirably interposed in discharge piping 17.

In the present system, ion exchange material loaded with ions extracted from the flowing solution is removed periodically from the adsorbent column 14 of the first, No. 1, ion exchange vessel of the series by means of an air lift 19 having its entrance 19a located at the bottom of the column immediately above the bottom 10a of the vessel, such air lift extending to the top of a holding vessel 20 consituting part of eluting means. Similarly, ion exchange material progressively less loaded is removed from the adsorbent columns of the subsequent ion exchange vessels, in turn, by means of respective air lifts 21, and is transferred to the next preceeding ion exchange vessels through the open tops thereof.

Although each adsorbent column of the several ion exchange vessels could be removed and transferred all at once, manually or mechanically as by the use of suitable baskets in the vessels to contain the respective columns and suitable mechanism to lift and carry such baskets, the use of air lifts to progressively transfer the ion exchange material from each adsorbent column is much to be preferred. As here shown, air for such air lifts may be supplied sequentially from any suitable source by way of respective inlet pipes 22 and under the control of an automatic sequence valve 23. It is preferred that each ion exchange vessel 10 be provided with a center well 24 through which the ion exchange material is fed by the air lift so as to avoid the overflowing solution.

The eluting means in the present instance includes a single elution vessel 25 in the form of a fixed bed ion exchange vessel, which may be of conventional construction adapted to receive loaded ion exchange material from holding vessel 20 under the control of valve 26. Elution vessel 25 has the usual provision 27 for inflow of eluate, 28 for inflow of rinse water and of material-transferring water, 29 for outflow of eluate, 30 for outflow of rinse water, and 31 for drainage, as well as 32 for flow of the regenerated ion exchange material into the open top of the last ion exchange vessel of the series. Separate timing means of conventional types is provided for the eluting means, as indicated in FIG. 5.

It is a feature of the invention that monitoring of the system and maintaining it in balance, with respect to the amount of ion exchange material in each adsorption column, is achieved in the eluting means by providing an excess of ion exchange material 33, FIG. 5, in the holding vessel 20, or, if no such holding vessel is present in the system, in the first ion exchange vessel of the system, to make up for any shortage in the adsorption column transferred to it.

As previously indicated, if the eluting means is operated manually, a visual level indicator is provided on the holding vessel; if operated automatically, level control instrumentation is provided.

The system may be employed utilizing both cationic and anionic ion exchange materials in the respective adsorption columns 14. Thus, as shown in FIG. 4, cationic material 34 occupies approximately the lower half of the adsorption column 14 in ion exchange vessel 10, while anionic material 35 occupies approximately the upper half of such adsorption column. The normal air lift 19 terminates normally at the bottom of the column but an additional air lift 36 is provided terminating at the interface 37 between the cationic and anionic materials in the column.

Whereas this invention is here specifically illustrated and described with respect to preferred embodiments thereof constituting the best mode presently contemplated for carrying it out in actual practice, it should be understood that various other embodiments are possible within the scope of the disclosure and claims hereof.

I claim:

1. A method of extracting ions from a liquid solution containing same, comprising continuously passing such a solution successively into the bottom of and upwardly through each ion exchange vessel of a series of two or more vessels, said vessels each initially containing an adsorption column of particulate ion exchange material of appropriate type through which said solution flows and with which it exchanges ions; removing substantially all of the loaded adsorption column from the first vessel of the series; thereafter replacing the removed adsorption column with substantially all the relatively less loaded adsorption column from the second vessel of the series, while continuing the flow of solution; and doing the same for each subsequent vessel of the series in turn, the adsorption column of the last vessel of the series being replaced by substantially unloaded ion exchange material; continuously withdrawing the treated solution from said last vessel of the series; and continually repeating the cycle during the period of operation of the method.

2. A method in accordance with claim 1, wherein the loaded adsorption column from the first vessel is passed into a fixed bed elution vessel, is eluted in said vessel, and is passed into the last ion exchange vessel of the series of same as replacement, substantially unloaded, ion exchange material.

3. A method in accordance with claim 2, wherein the loaded adsorption column from the first vessel is first passed into a holding vessel and subsequently into the elution vessel.

4. A method in accordance with claim 3, wherein there is an excess of ion exchange material in the holding vessel to make up for any shortage in the adsorption column transferred to it from the first ion exchange vessel, thereby providing for metering of the material and monitoring of the system.

5. A method in accordance with claim 1, wherein there is an excess of ion exchange mterial in the first ion exchange vessel to make up for any shortage in the adsorption column transferred to it from the second ion exchange vessel, thereby providing for metering of the material and monitoring of the system.

6. A method in accordance with claim 2, wherein the replacement, substantially unloaded, ion exchange material is introduced into the last ion exchange vessel of the series simultaneously with the removal of the loaded adsorption column from the first ion exchange vessel of the series in cycles subsequent to the first.

7. A method in accordance with claim 1, wherein the replacement, substantially unloaded, ion exchange material is introduced into the last ion exchange vessel of the series simultaneously with the removal of the loaded adsorption column from the first ion exchange vessel of the series in cycles subsequent to the first.

8. A method in accordance with claim 1, wherein removal and transfer of the adsorption columns from the vessels of the series is accomplished by progressively removing ion exchange material from the bottoms of the respective columns upwardly through a conduit that extends upwardly through the column, by introducing air under pressure into the lower end of such conduit.

9. A method in accordance with claim 1, wherien the adsorption column of ion exchange material in each of the ion exchange vessels is kept free to and is expanded upwardly by the solution flowing upwardly therethrough.

10. Apparatus for continuously extracting ions from a liquid solution containing same, comprising a series of ion exchange vessels, each initially containing an adsorption column of a particulate ion exchange material of appropriate type; an inlet at the bottom of the adsorption column of the first vessel of the series for the continuous introduction of solution to be treated; an outlet at the upper end of the adsorption column of the last vessel of the series for the continuous discharge of treated solution; a flow conduit for each vessel of the series, except the last, extending from the top of the adsorption column of that vessel to the bottom of the adsorption column of the next subsequent vessel of the series, so that solution flows continuously from the bottom of one adsorption column to the top of that column and then to the bottom of the next subsequent adsorption column; means in association with said first vessel of the series for removing the adsorption column thereof; means in association with each of the subsequent vessels of the series for transferring the adsorption column of that vessel to the next preceeding vessel of the series; means for replacing the adsorption column of the last vessel of the series with substantially unloaded ion exchange material; and means for sequentially operating said removing means, each of said transferring means in turn, and said replacing means.

11. Apparatus in accordance with claim 10, wherein additional means are provided for eluting the loaded adsorption column removed from the first vessel of the series and to introduce the eluted ion exchange material thereof into the last vessel of the series as replacement for the adsorption column transferred therefrom.

12. Apparatus in accordance with claim 11, wherein the eluting means comprises at least one fixed bed ion exchange vessel; and the adsorption column of the first ion exchange vessel of the series contains an excess of ion exchange material to enable metering of material and monitoring of the system in the eluting means.

13. Apparatus in accordance with claim 11, wherein the eluting means comprises at least one fixed bed ion exchange vessel; a holding vessel adapted to feed into each exchange vessel; and an excess of ion exchange material in the holding vessel to enable metering of material and monitoring of the system.

14. Apparatus in accordance with claim 10, wherein the ion exchange material in the respective adsorption columns is made up of both an anion material and a cation material and the means for removing the adsorption column from the first vessel of the series comprises means for selectively and separately removing both the anion material and the cation material.

15. Apparatus in accordance with claim 14, wherein the means for selectively and separately removing both the anion material and the cation material comprise respective air lifts, the entrance to one of which is located just above the interface level of the two materials in the column, and the entrance to the other of which is located just above the bottom of the vessel.

16. Apparatus in accordance with claim 10, wherein the means for operating the removing means, the transferring means, and the replacing means are adapted to operate the several specified means successively in timed sequence, so that, when one vessel is empty of ion exchange material, the relatively less loaded ion exchange material in the next subsequent vessel of the series of vessels is transferred to it and substantially unloaded ion exchange material is finally introduced into the empty last vessel of the series of vessels.

17. Apparatus in accordance with claim 10, wherein the means for sequentially operating the removing means, the transferring means, and the replacing means are adapted to begin operation of the removing means simultaneously with operation of the replacing means.

18. Apparatus in accordance with claim 10, wherein the means for removing the adsorption column from the first vessel of the series and the means for transferring the adsorption columns from column to column are air lifts.

19. Apparatus in accordance with claim 18, wherein the means for operating the removing means, the transferring means, and the replacing means comprises an automatic sequence valve controlling flow of pressure air to the air lifts.

* * * * *